United States Patent [19]
Thomas et al.

[11] Patent Number: 5,540,479
[45] Date of Patent: Jul. 30, 1996

[54] VEHICLE SEATS

[76] Inventors: Alan V. Thomas, 118 Leicester Road, Shepshed, Leicestershire LE12 9DH; Guy H. Taylor, 8 Coachouse Court, Unthank Road, Norwich, Norfolk NR4 7QR, both of United Kingdom

[21] Appl. No.: 273,568

[22] Filed: Jul. 11, 1994

Related U.S. Application Data

[63] Continuation-in-part of Ser. No. 59,557, May 10, 1993, abandoned.

[30] Foreign Application Priority Data

May 22, 1992 [GB] United Kingdom .................. 9211014

[51] Int. Cl.⁶ .................................................. A47C 13/00
[52] U.S. Cl. ...................... 297/113; 297/115; 297/238; 297/403; 297/411.33
[58] Field of Search ................................ 297/113, 115, 297/251, 238, 283.1, 283.2, 283.4, 403, 410, 411.32, 411.33, 411.44

[56] References Cited

U.S. PATENT DOCUMENTS

| | | | |
|---|---|---|---|
| 2,584,481 | 2/1952 | Mast et al. | 297/115 |
| 3,374,032 | 3/1968 | Del Giudice | 297/115 X |
| 3,652,125 | 3/1972 | Rogers, Jr. | 297/403 |
| 4,558,901 | 12/1985 | Yokoyama | 297/411.33 X |
| 5,106,158 | 4/1992 | Dukatz et al. | 297/238 X |
| 5,224,756 | 7/1993 | Dukatz et al. | 297/238 |

FOREIGN PATENT DOCUMENTS

| | | | |
|---|---|---|---|
| 4225880 | 2/1993 | Germany | 297/113 |
| 2112637 | 7/1983 | United Kingdom | 297/403 |

*Primary Examiner*—Laurie K. Cranmer
*Attorney, Agent, or Firm*—Davis, Bujold & Streck, P.A.

[57] ABSTRACT

A seat adapted to accommodate three passengers has a seat cushion and a seat back, three headrests are located in juxtaposed relationship along the upper edge of the seat back, the central headrest is coupled to a central armrest so that the headrest will retract into the seat back when the armrest is lowered and will be raised so that it extends upwardly from the upper edge of the seat back when the armrest is raised.

20 Claims, 9 Drawing Sheets

VEHICLE SEATS

This is a continuation-in-part of application Ser. No. 08/059,557 filed on May 10, 1993 now abandoned.

BACKGROUND TO THE INVENTION

The present invention relates to vehicle seats and in particular to the provision of headrests on vehicle seats which may be occupied by passengers sitting three abreast.

In conventional five seater saloon, hatchback or estate cars the rear seat is normally only fitted with two headrests. The reason for this is that while the rear seat is designed to accommodate up to three passengers, for the majority of time two or fewer passengers will be accommodated and under such circumstances, the provision of a third headrest would unnecessarily restrict the rearward view of the driver. However, when the third passenger is accommodated on the seat, a central headrest would contribute significantly to the safety and comfort of the third passenger.

SUMMARY OF THE INVENTION

According to one aspect of the present invention, a seat adapted to accommodate three passengers comprises a seat cushion and a seat back, three headrests being located in juxtaposed relationship along an upper edge of the seat back and an armrest being provided centrally of the seat back, the armrest being selectively movable between a raised position in which it is flush with the seat back and a lowered position in which it divides the seat into two for occupation by two or fewer passengers, the armrest being interconnected to the central headrest such that when the armrest is in its lowered position, the central headrest is retracted into the seat back, but when the armrest is in its raised position the central headrest will be raised so that it extends upwardly from the upper edge of the seat back.

In this manner, when two or fewer passengers occupy the seat the armrest may be lowered to retract the central headrest, so that obstruction of the rearward view is minimised, while the armrest may be raised to accommodate a third passenger, raising the headrest to provide restraint for the third passenger's head to guard against whiplash injuries to the neck in a rear impact or rebound in a front impact accident.

BRIEF DESCRIPTION OF THE DRAWINGS

The invention is now described, by way of example only, with reference to the accompanying drawings, in which.

DESCRIPTION OF A PREFERRED EMBODIMENT

As illustrated in FIGS. 1 to 4, a rear seat 10 of a motor vehicle has a seat cushion 11 and a seat back 12. Headrests 13 and 14 are mounted on the upper edge 15 of the seat back 12 in conventional manner, the headrests 13 and 14 being located adjacent opposite ends of the seat back 12.

A central headrest 20 is located between headrests 13 and 14. The central headrest 20 is mounted on a stem 21, the stem 21 being attached to a carriage 22 which is slidingly located with respect to the seat back 12 on a pair of parallel guide rails 23. The guide rails 23 are located on either side of a recessed portion 24 of the seat back 12.

Figure 1:
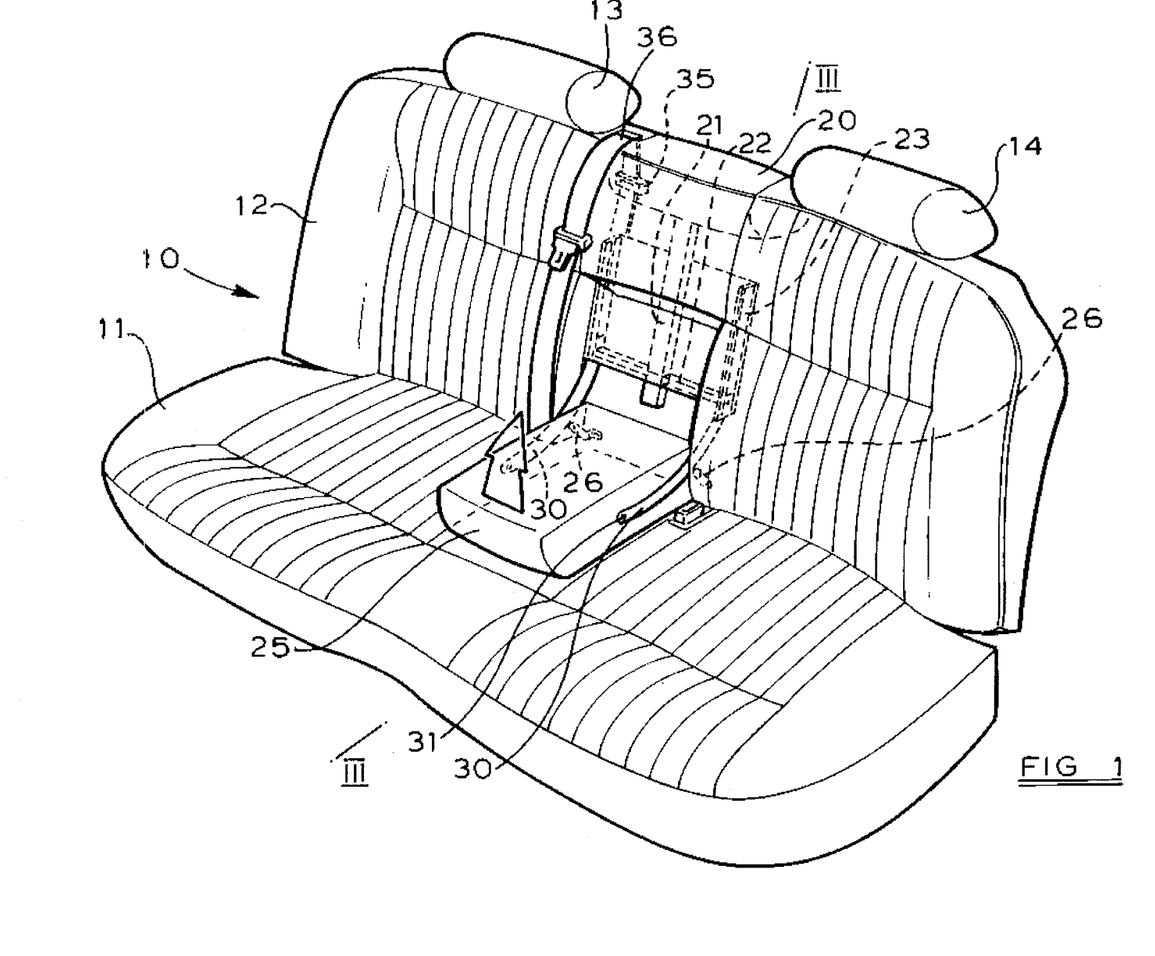
FIG. 1 is a perspective view of a seat formed in accordance with the present invention, with the armrest down.
Figure 2:
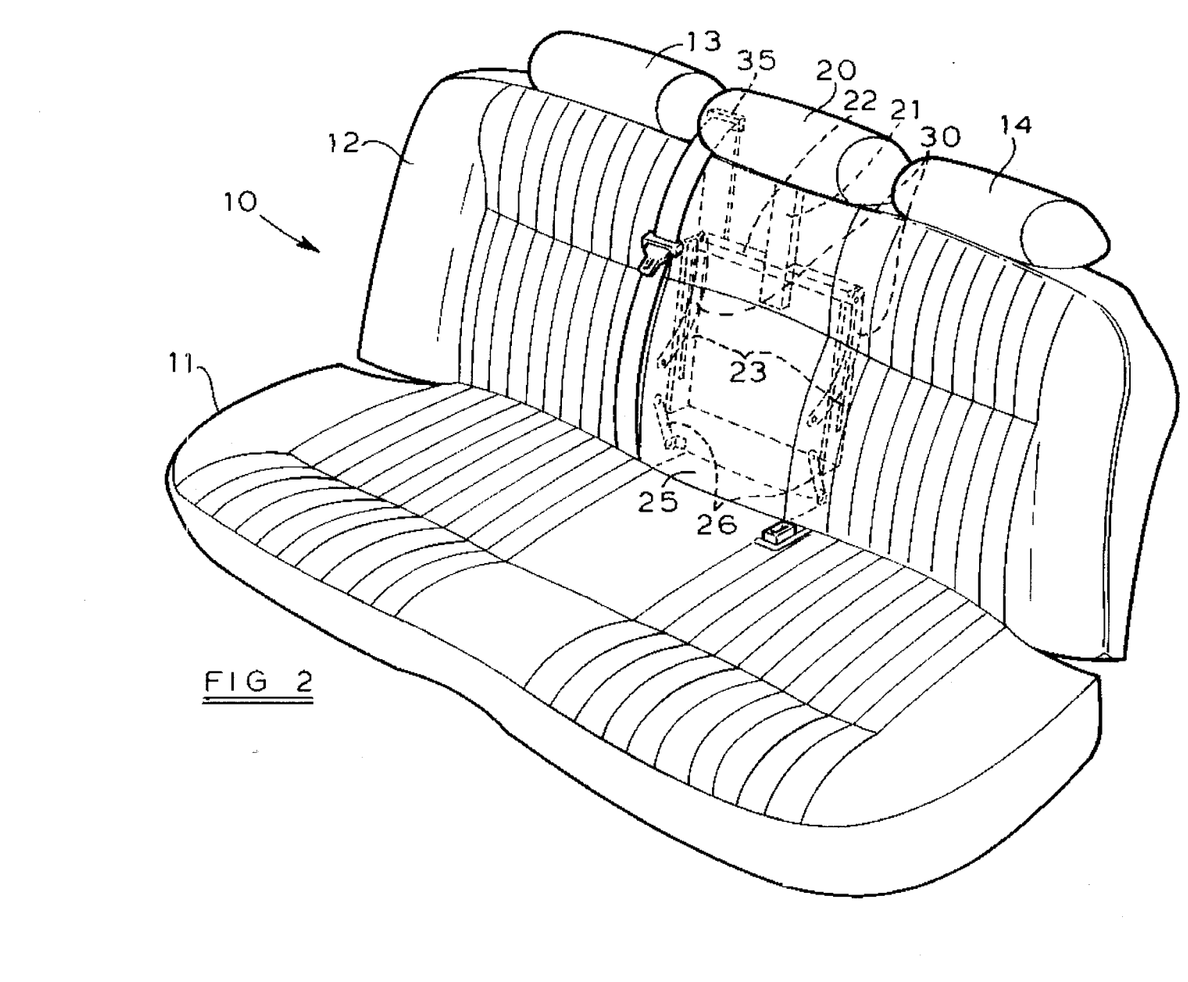
FIG. 2 is a perspective view of the seat illustrated in FIG. 1, with the armrest up.
Figure 3:
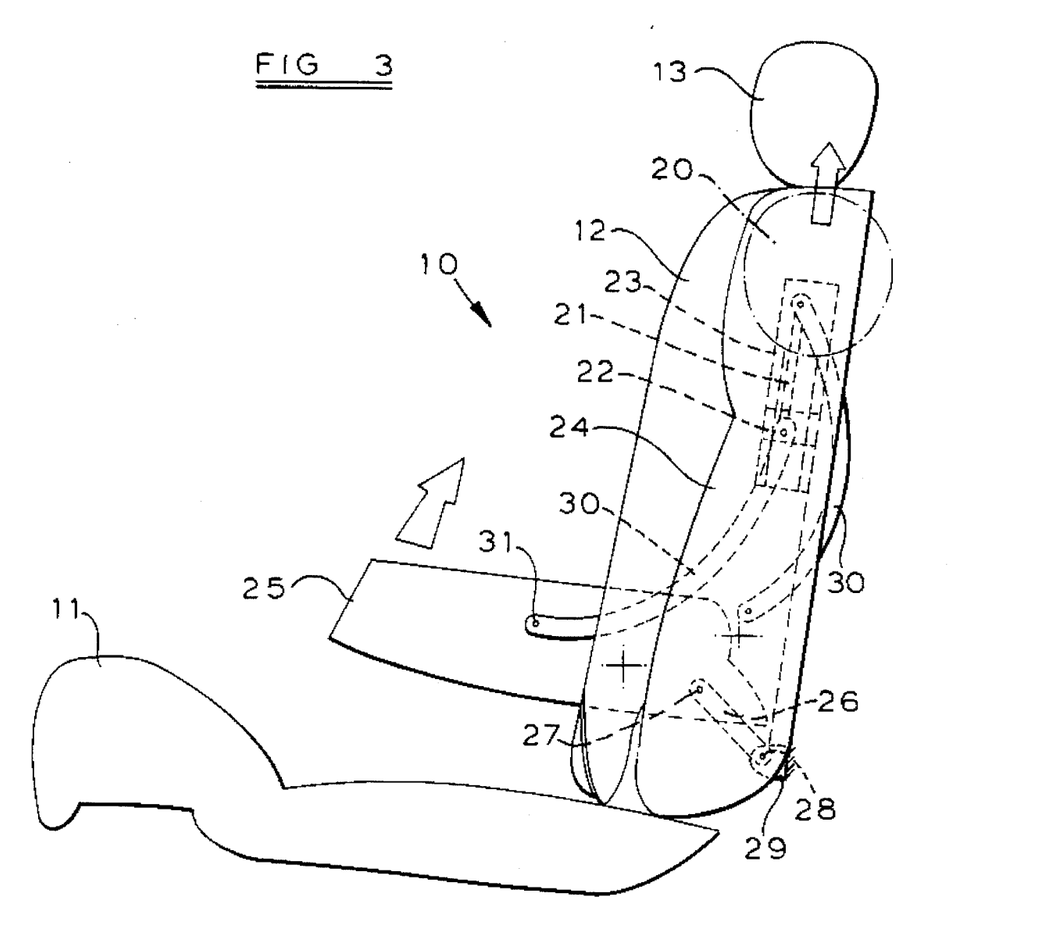
FIG. 3 is a sectional elevation along the line III—III of FIG. 1.

An armrest 25 is pivotally mounted in the recessed portion 24 of seat back 12, by means of a first pair of links 26. Each link 26 is attached at one end to a different side of the armrest 25, by means of pivot 27 and at the other end to a support bracket 29, by means of pivot 28. Each pair of pivots 27 and 28 are coaxial thereby permitting the armrest 25 to pivot between a lowered position in which it divides the seat into two (as illustrated in FIG. 1) and a raised position in which the armrest 25 is flush with the seat back 12 (as illustrated in FIG. 2). A pair of second links 30 are attached at one end, one to each side of the armrest 25 by means of pivot 31 and at the other end, to the corresponding end of the carriage 22. The pivot connections 31 are spaced forwardly of pivot connections 27 when the armrest 25 is in its lowered position and the link 30 is dimensioned so that; when the armrest is in its lowered position, the headrest 20 will be retracted fully into the seat back 12 (as illustrated in FIG. 1); and when the armrest 25 is moved to its raised position, movement of the armrest 25 will be transmitted via links 30 to the carriage 22 to raise the headrest 20 to a position corresponding to that of headrests 13 and 14 (as illustrated in FIG. 2).

Figure 4:
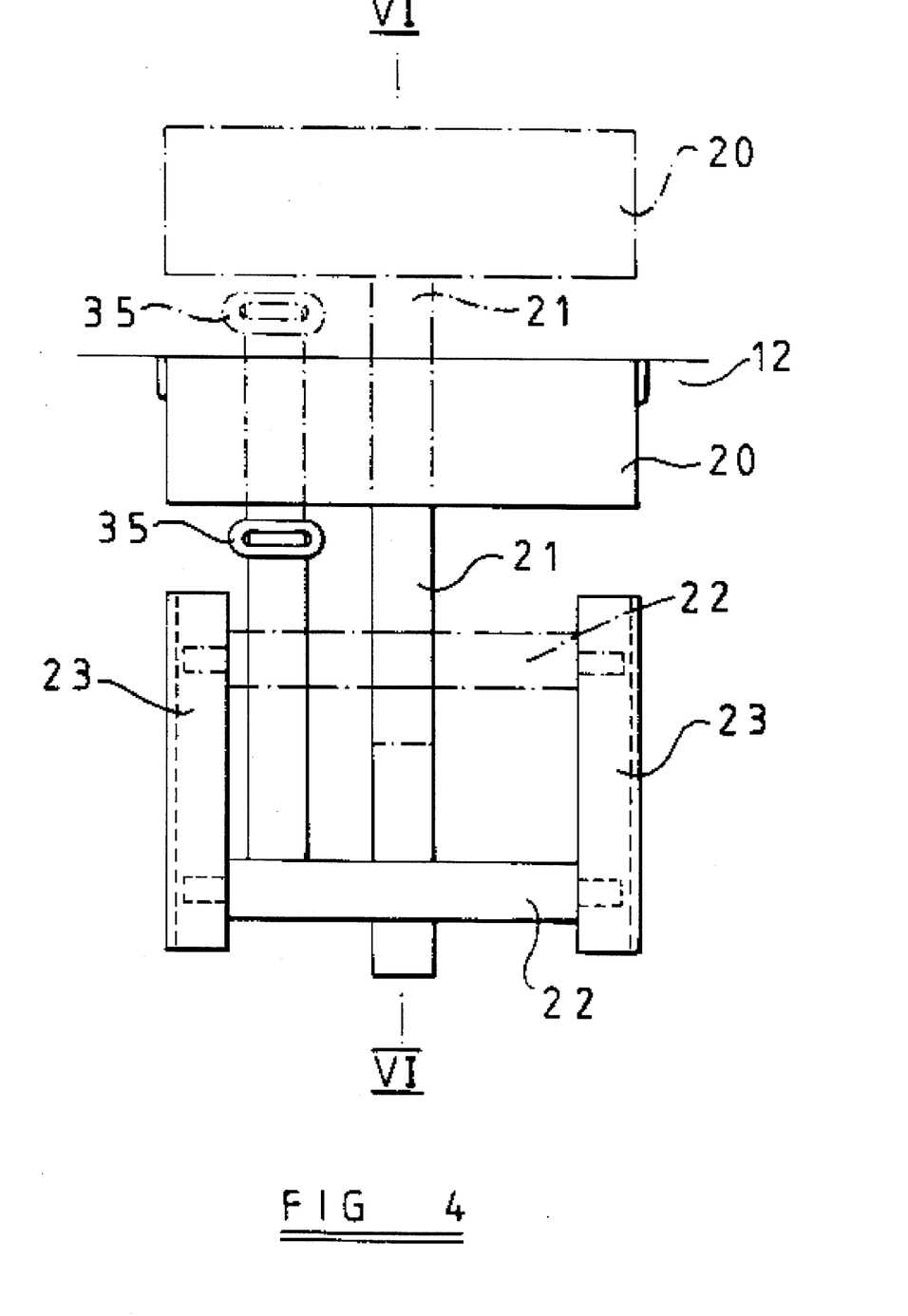
FIG. 4 is a front elevational view of the central headrest moving mechanism illustrated in FIG. 1.

As illustrated in greater detail in FIG. 4, an upper mounting 35 for seat belt 36 may also be mounted for movement with the carriage 22 so that the seat belt mounting 35 will move with the headrest 20 from a retracted position to a raised position, when the armrest 25 is moved from its lowered to its raised position.

Figure 5:
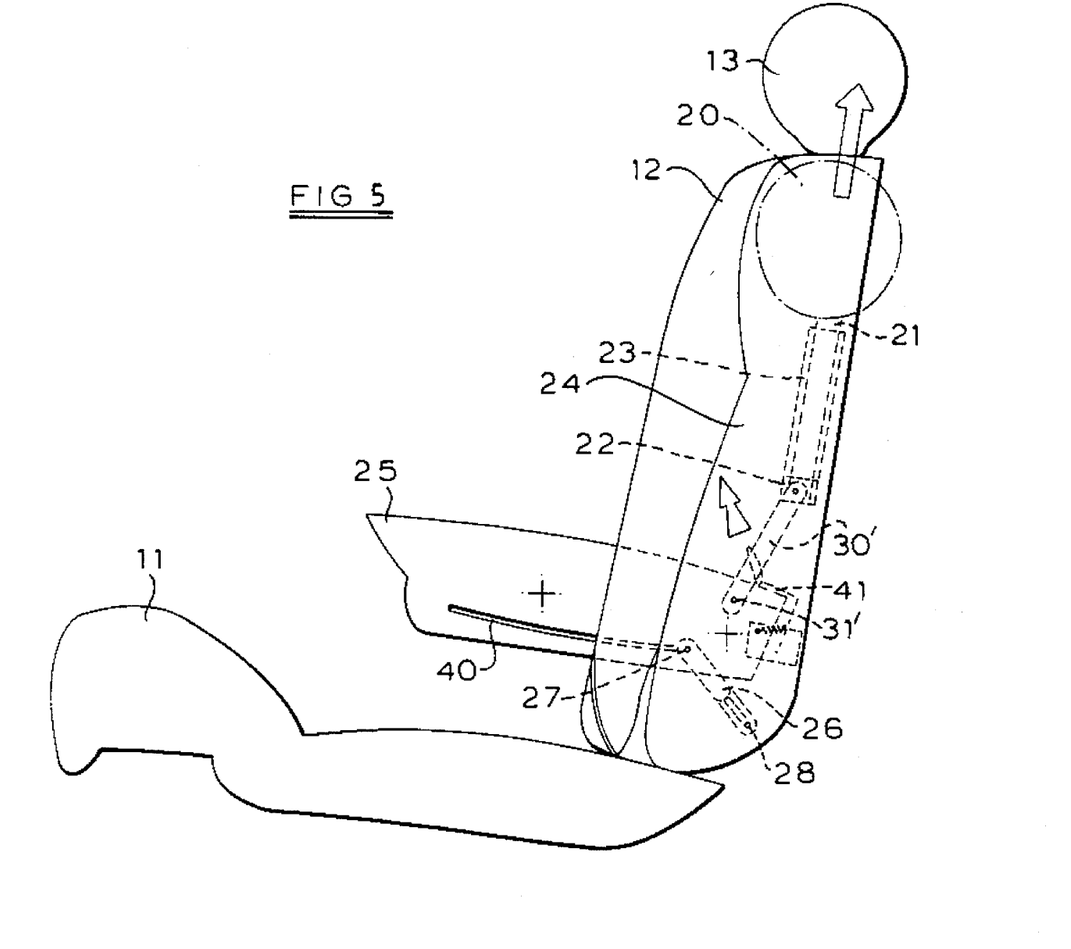
FIG. 5 is a sectional elevation similar to FIG. 3, of a second embodiment of the invention.

In the embodiment illustrated in FIG. 5, the pivots 27 which attach links 26 to the armrest 25, engage in elongate slots 40. In this manner, the armrest 25 may be moved between its lowered and raised position by respectively raising or lowering the edge which is rearmost when in the lowered position. The armrest 25 is retained in its lowered position, by means of a spring loaded detent 41. In this embodiment, the links 30' are attached to the armrest 25 by means of pivots 31' located rearwardly of the pivots 27 when the armrest is in the lowered position, the other ends of links 30' being pivotally connected to the carriage 22. In this manner, as the rearward edge of armrest 25 is raised to move the armrest from its lowered to its raised position, the links 30' will cause the carriage 22 and headrest 20 attached thereto, to move upwardly to its raised position, while as the rearward edge of armrest 25 is lowered to move the armrest 25 to its lowered position, the links 30' will cause the carriage 22 and headrest 20 to move downwardly to its retracted position.

Figure 6:
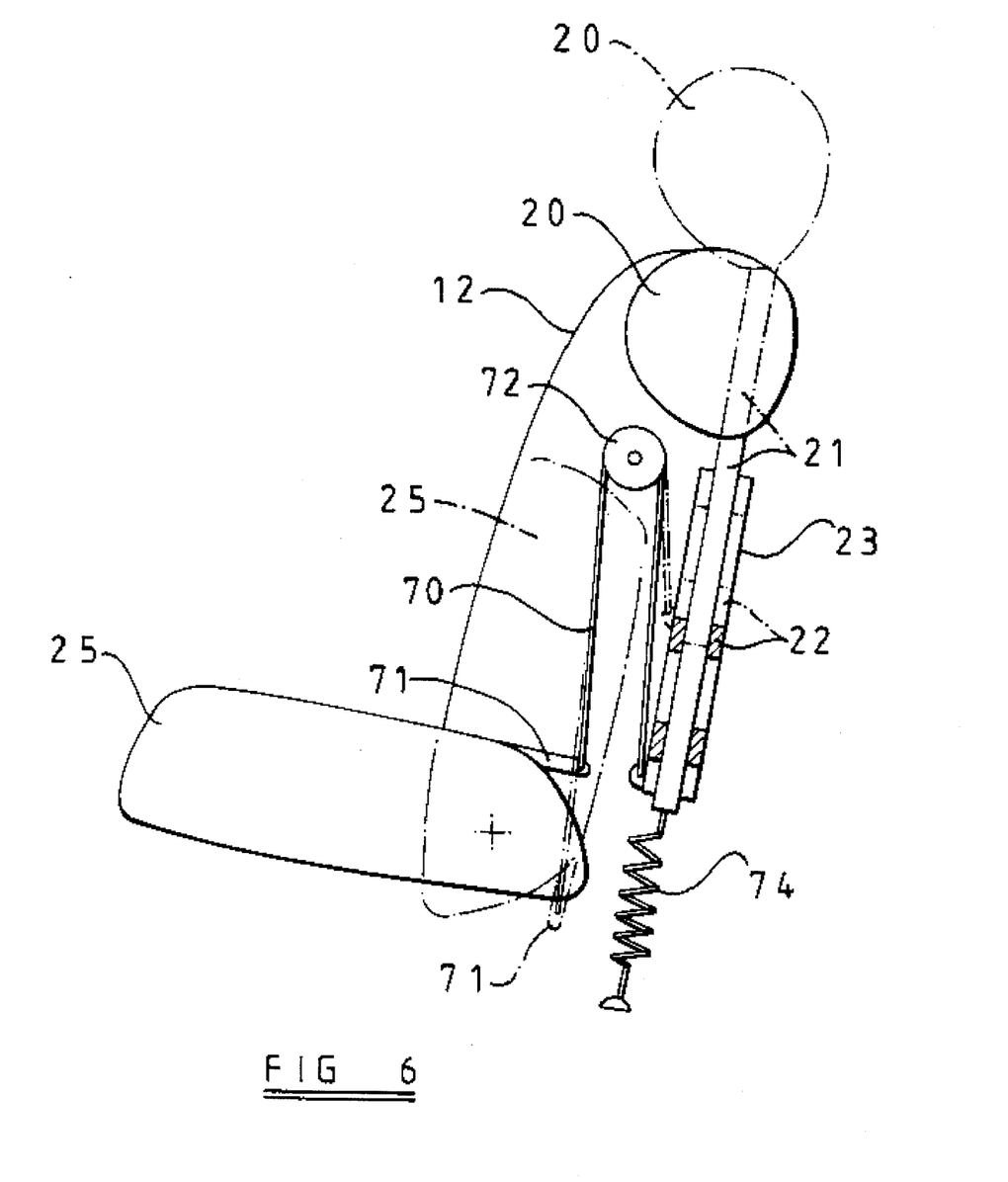
FIG. 6 is a diagrammatic side elevation of a third embodiment of the present invention.

In the embodiment illustrated in FIG. 6, the armrest 25 is connected to the carriage 22 by means of a cable 70, the cable 70 being connected at one end to an arm 71 extending rearwardly from the armrest 25 and at the other end to the carriage 22. The cable passes over a pulley 72 secured with respect to the seatback at a level above the connection of the cable to the armrest 25 and the carriage 22, so that upon movement of the armrest 25 from its lowered position (as shown in full line in FIG. 6) to its raised position (as shown in broken line in FIG. 6), the end of a cable 70 will be pulled downwardly by arm 71 and the carriage 22 with headrest 20 attached thereto, will be moved upwardly. A tension spring 74 acts on the carriage 22 to pull the carriage 22 down when tension in the cable 70 is released by pivoting the armrest 25 from its raised to its lowered position.

Figures 7, 8:
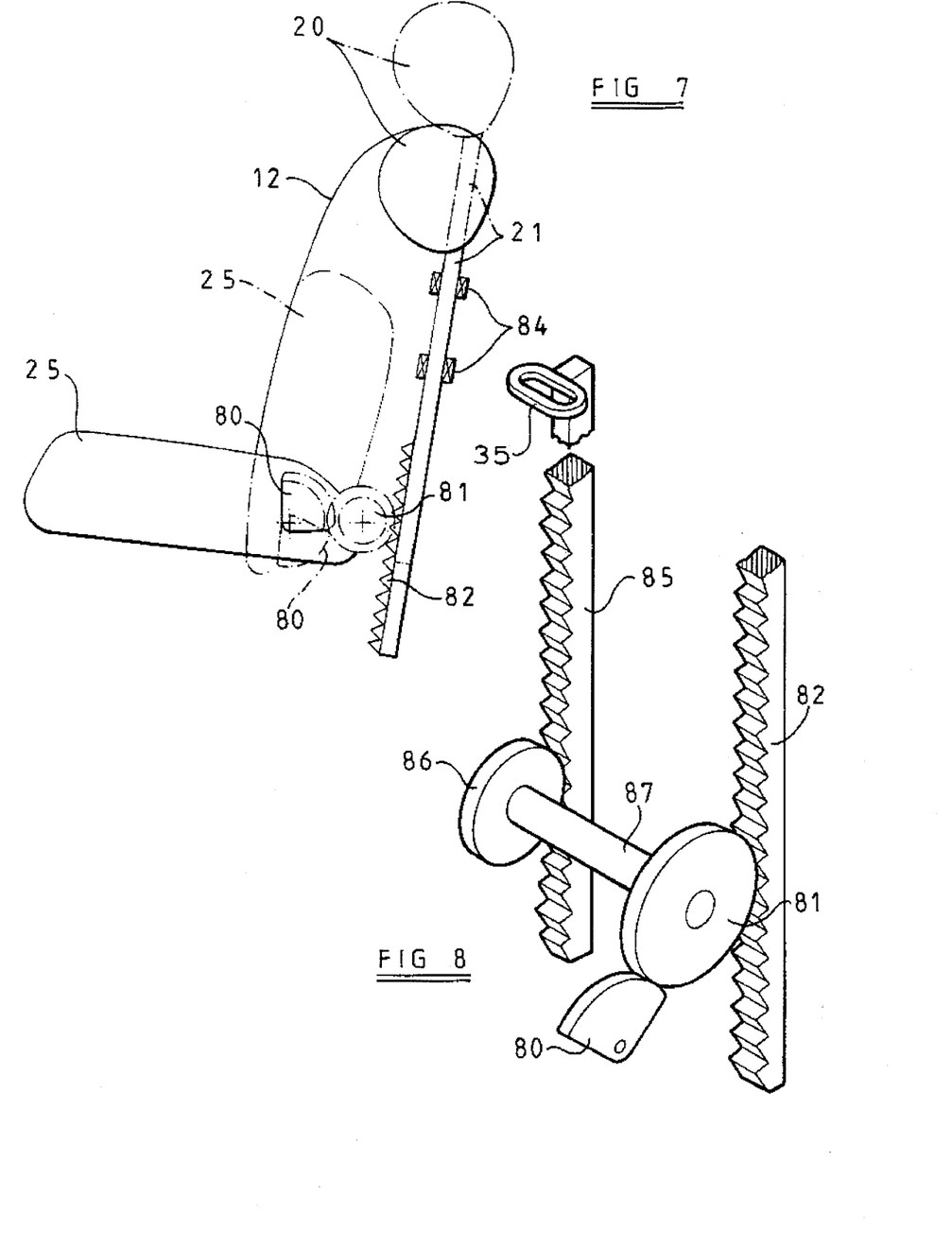
FIG. 7 is a diagrammatic side elevation of a fourth embodiment of the invention.
FIG. 8 is a perspective view illustrating the headrest/seat belt anchorage lifting mechanism of the embodiment illustrated in FIG. 7.

In the embodiment illustrated in FIGS. 7 and 8, a gear quadrant 80 is mounted for movement with the armrest 25. The gear quadrant 80 meshes with an intermediate gear 81 which in turn meshes with a rack 82. The rack 82 is connected to the headrest 20 so that movement of the rack 82 will control vertical movement of the headrest 20. Suitable guide means, for example a carriage 22 and guides 23 as described above, or bushes 84, are provided to control axial movement of the rack 82.

With this form of mechanism, the seat belt anchorage 35 may be arranged to move with a headrest 20, in the manner illustrated with reference to FIGS. 1 to 4. Alternatively, as illustrated in FIG. 8, the seat belt anchorage 35 may be mounted on a separate rack 85 for movement independent of the headrest 20. A pair of gears 81, 86 are mounted on a shaft 87 for rotation with the shaft 87. The gear 81 meshes with the rack 82 for movement of the headrest 20, or gear 86 meshes with rack 85 for movement of the seat belt anchorage 35. The quadrant gear 80 on the armrest 25 meshes with only one of the gears 81, 86, the other gear 86, 81 being driven by the shaft 87. The gears 81 and 86 may be of different drive ratios thereby giving differential movement of the headrest 20 and seat belt anchorage 35.

With this embodiment, movement of the armrest 25 from its lowered to its raised position will cause the gear mechanism 80, 81, 82 to move the headrest 20 to its raised position, while movement of the armrest 25 from its raised position to its lowered position will cause the gear mechanism 80, 81, 82 to move the headrest 20 to its lowered position.

Figure 9:
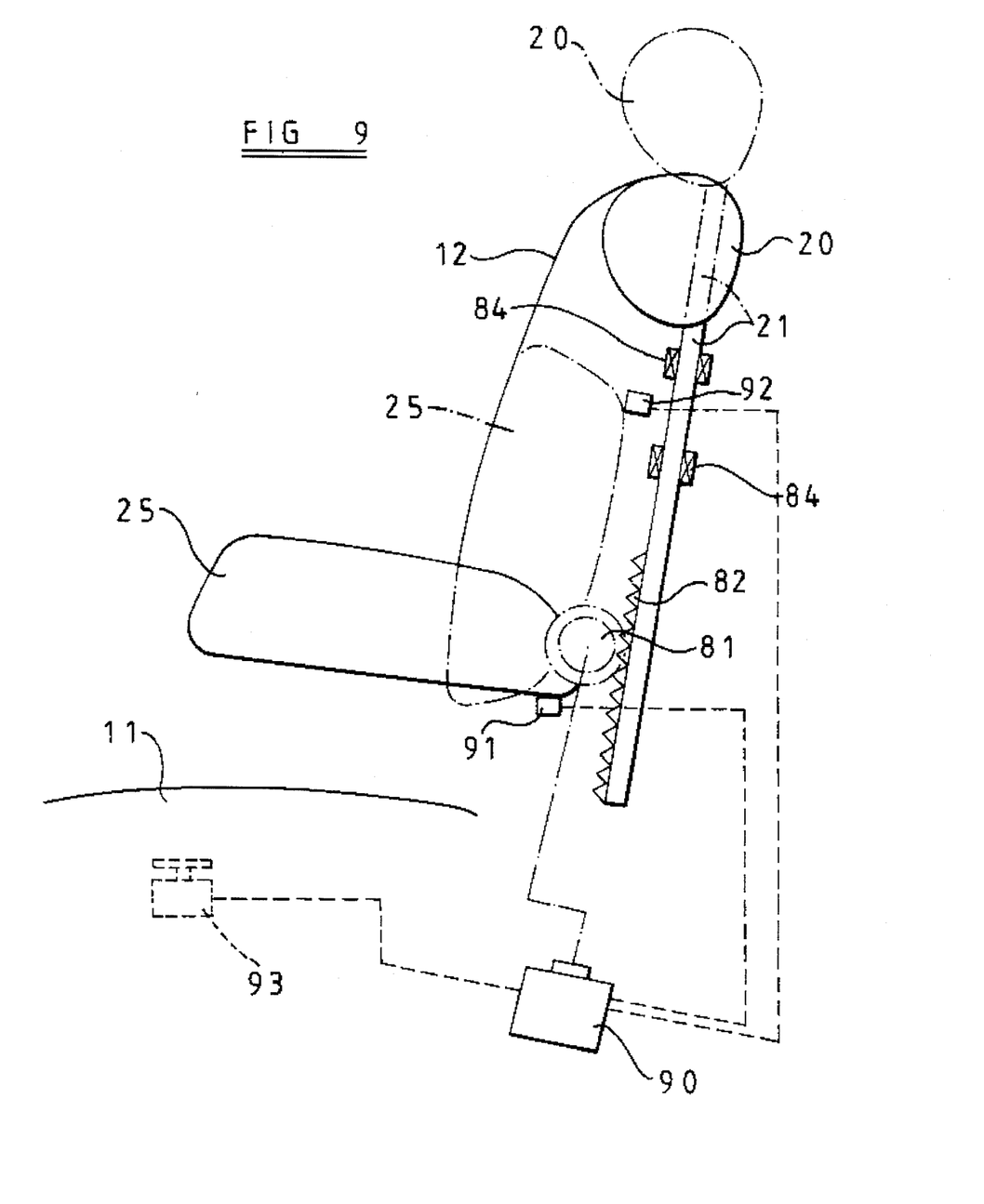
FIG. 9 illustrates diagrammatically a modification to the embodiment illustrated in FIGS. 7 and 8.

As illustrated in FIG. 9, in a modification, the gears 80 and 86 may be driven by an electric motor 90, the electric motor 90 being controlled by switches 91, 92 which sense the fully lowered and fully raised positions of the armrest 25. Alternatively, the motor 90 may be controlled by a pressure switch 93 which is located beneath the central portion of the seat 11 and senses when that portion of the seat 11 is occupied by a passenger.

Various modifications may be made without departing from the invention. For example, while in the embodiments illustrated in FIGS. 1 to 6, the upper mounting 35 for the seat belt 36 is attached to the carriage 22, a separate linkage may be provided for this purpose so that relative movement to the armrest 25 could be different from that of the headrest 20.

Figures 10, 11:
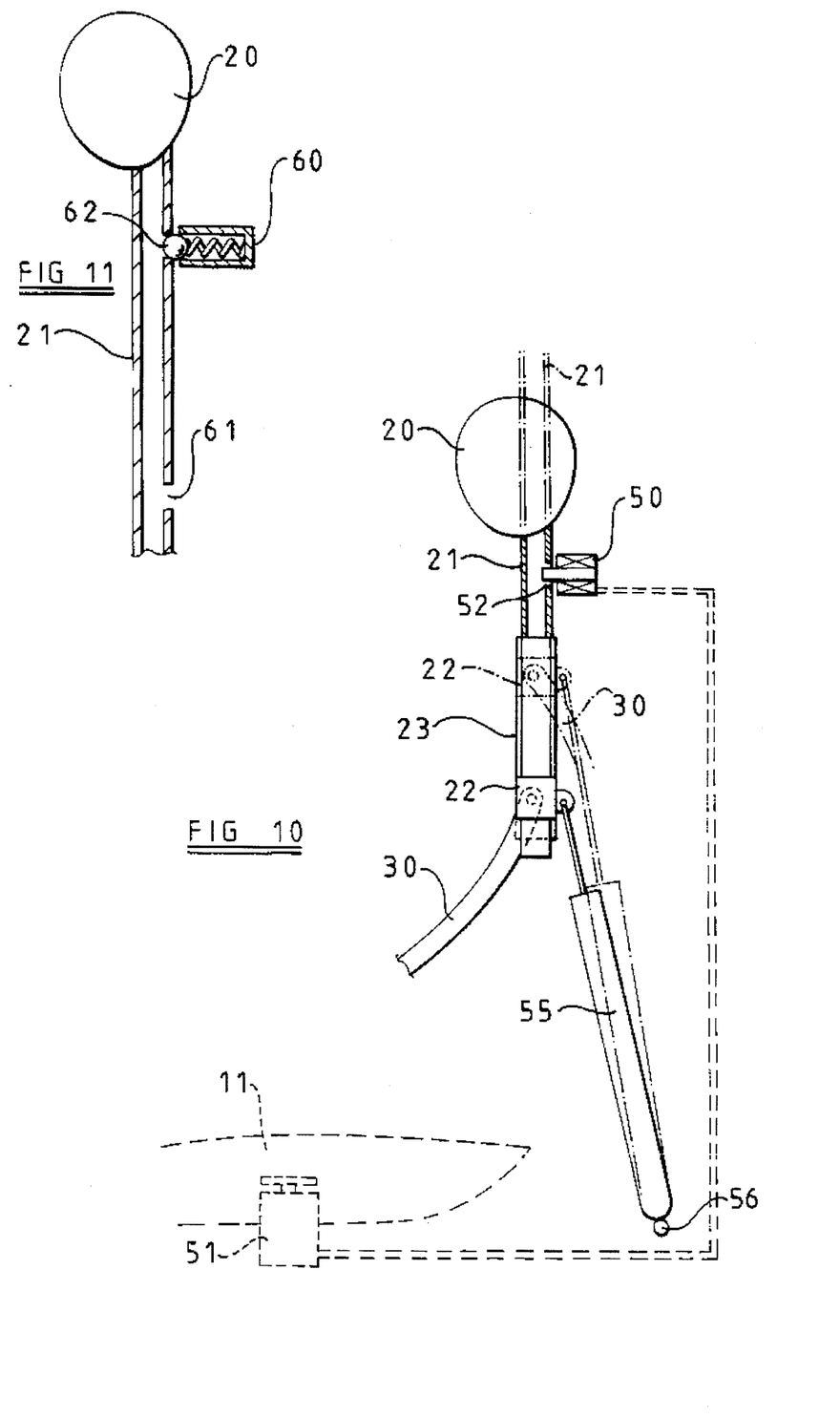
FIG. 10 illustrates a modification to the embodiments illustrated in FIGS. 1 to 6.
FIG. 11 illustrates an alternative modification to the embodiments illustrated in FIGS. 1 to 6.

The whole assembly may be positively located in the raised position by a detent or interlock device which may possibly be actuated by the pressure of a passenger sitting in the central portion of the seat. For example, as illustrated in FIG. 10, a pressure switch 51 located beneath the central portion of the seat 11, may control a solenoid plunger 50. The solenoid is energised when the central portion of the seat 11 is occupied, to locate the plunger 50 in an aperture 51 in the stem 21 which supports the headrest 20, when the headrest 20 is in its raised position. The plunger 50 thereby ensures that the headrest 20 remains in its raised position when the central portion of the seat 11 is occupied. When the occupant leaves the seat, the solenoid is de-energised permitting the plunger 50 to disengage from the aperture 51, so that the headrest 20 may be lowered.

The positioning of the pivots relative to the centre of gravity of the armrest, and/or the other parts of the system may also be arranged so that any acceleration/deceleration motion of the car will tend to maintain the system in its set position. Alternatively, or in addition, over-centre toggling of the mechanism, detents, latches or other means may be provided to prevent unintentional movement of the components from either position. For example, as illustrated in FIG. 11, a spring loaded ball latch 60 may be provided to engage apertures 61, 62 in the stem 21 supporting the headrest 20. The ball latch 60 will thereby engage aperture 61 when the headrest 20 is in its raised position and will engage aperture 62 when the hearest 20 is in its lowered position.

Means may also be provided for adjusting the height of the central and/or outer headrests to suit the occupants of the seat. Furthermore, means may be provided for lowering the headrests independently of the armrest, for example when reverse gear is engaged, to improve rearward vision when reversing.

Means, for example, mechanical, electromechanical, pneumatic or hydraulic may be provided for assisting movement of the armrest and associated mechanism between its raised and lowered position. For example, as illustrated in FIG. 10, a gas strut 55 may be connected at one end to the carriage 22 and at the other end to the body of the vehicle at a position 56 below the carriage 22 when in its lowermost position. In this manner, when the armrest 25 and headrest 20 are lowered, the gas strut 55 will be compressed and will provide assistance to the raising of the headrest 20 when the armrest 25 is raised.

Although the above embodiments have been described with reference to the rear seat of a motor vehicle, it will be appreciated that it can be applied to any seat arranged to accommodate up to three passengers.

We claim:

1. A seat adapted to accommodate three passengers comprising a seat cushion and a seat back, three headrests being located in juxtaposed relationship along an upper edge of the seat back and an armrest being provided centrally of the seat back, the armrest being selectively movable between a raised position in which it is flush with the seat back and a lowered position in which it divides the seat into two for occupation by two or fewer passengers, the armrest being interconnected to the central headrest such that when the armrest is in its lowered position, the central headrest is retracted into the seat back, but when the armrest is in its raised position the central headrest will be raised so that it extends upwardly from the upper edge of the seat back.

2. A seat according to claim 1 in which the central headrest is mounted upon a carriage, guide means being provided to guide movement of the carriage relative to the seat back and links being provided between the carriage and the armrest to transmit movement of the armrest to the carriage.

3. A seat according to claim 2 in which the armrest is pivotally connected to the seat back so that the armrest may be moved from its lowered position to its raised position by upward movement of a front edge of the armrest, a link pivotally connected at one end to the armrest and at the other end to the carriage, the pivotal connection between the link and the armrest being positioned forwardly of the pivotal connection between the armrest and the seat back when the armrest is in its lowered position, so that as the armrest is moved from its lowered position to its raised position, the pivotal connection between the armrest and the link connected to the carriage will move above the pivotal connection between the armrest and the seat back, thereby raising the carriage and headrest attached thereto.

4. A seat according to claim 1 in which the armrest is pivotally connected to the seat back, so that it may be moved from its lowered position to its raised position by moving a rearward edge of the armrest upwardly, the pivotal connection between the armrest and seat back engaging in an elongate slot so that the armrest may be moved relative to the pivotal connection, and a link pivotally connected at one end to the armrest and at the other end to the carriage, the pivotal connection between the armrest and the carriage being positioned rearwardly of the pivotal connection between the armrest and seat back.

5. A seat according to claim 1 in which the central headrest is mounted on a carriage, guide means being provided to guide movement of the carriage relative to the seat back, a cable being connected at one end to the armrest and at the other end to the carriage, the cable passing over a pulley mounted with respect to the seat back at a level above the level of the connection of the cable to the armrest and the carriage, so that upon movement of the armrest from its lowered position to its raised position the end of the cable connected to the armrest will be moved downwardly to raise the carriage and headrest, spring means being provided to return the carriage to its lowered position when tension in the cable is relaxed by movement of the armrest from its raised to its lowered position.

6. A seat according to claim 5 in which the seat belt mounting is arranged to move with the central headrest.

7. A seat according to claim 1 in which an upper mounting for a seat belt is interconnected with the armrest so that the mounting will move from a retracted position when the armrest is in its lowered position to a raised position when the armrest is in its raised position.

8. A seat according to claim 1 in which the headrest is mounted on a rack, a gear quadrant being mounted for movement with the armrest, the gear quadrant meshing with a first intermediate gear the first intermediate gear also meshing with the rack, so that upon movement of the armrest from its lowered to its raised positon the rack and headrest mounted thereon will be raised and upon movement of the armrest from its raised to its lowered position the rack and armrest mounted thereon will be lowered.

9. A seat according to claim 8 in which an upper mounting for a seat belt is interconnected with the armrest so that the mounting will move from a retracted position when the armrest is in its lowered position to a raised position when the armrest is in its raised position.

10. A seat according to claim 9 in which the upper mounting for the seat belt is mounted on a second rack, a second intermediate gear meshing with said second rack, the first and second intermediate gears being mounted on a shaft for rotation with the shaft, the quadrant gear mounted on the armrest meshing with one of said first and second intermediate gears, the other intermediate gear being driven by the shaft.

11. A seat according to claim 10 in which the intermediate gears have different drive ratios to provide differential movement of the first and second rack.

12. A seat according to claim 1 in which the headrest is mounted on a rack, a gear meshing with the rack and an electric motor arranged to drive the gear, said electric motor being controlled by switch means responsive to the position of the armrest or occupancy of the central portion of the seat.

13. A seat according to claim 12 in which switch means are provided for sensing the fully raised and fully lowered positions of the armrest.

14. A seat according to claim 12 in which a pressure switch is provided to sense occupancy of the central portion of the seat.

15. A seat according to claim 1 in which means is provided to prevent unintentional movement of the components from either their raised or lowered position.

16. A seat according to claim 15 in which said means to prevent unintentional movement of the components comprises a spring loaded ball latch which is arranged to engage a first aperture in the headrest support, when the headrest is in its raised position and a second aperture in the headrest support, when the headrest is in its lowered position.

17. A seat according to claim 1 in which means is provided for preventing lowering of the components when the central portion of the seat is occupied.

18. A seat according to claim 17 in which a solenoid plunger is arranged to engage an aperture in a headrest support when the headrest is in its raised position, the solenoid plunger being controlled by a pressure switch located beneath the central portion of the seat.

19. A seat according to claim 1 in which means is provided to assist movement of the armrest and headrest between their raised and lowered positions.

20. A seat according to claim 19 in which a gas strut acts between a headrest support and a point on the vehicle body located beneath the connection to the headrest support, so that when the headrest is in its lowered position, the gas strut will be compressed and will provide assistance when the headrest is moved to its raised position.

* * * * *